United States Patent
Yano et al.

(10) Patent No.: US 11,085,120 B2
(45) Date of Patent: Aug. 10, 2021

(54) STAINLESS STEEL SHEET FOR FUEL CELL SEPARATORS AND PRODUCTION METHOD THEREFOR

(71) Applicant: JFE STEEL CORPORATION, Tokyo (JP)

(72) Inventors: Takayoshi Yano, Tokyo (JP); Shin Ishikawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 47 days.

(21) Appl. No.: 16/489,881

(22) PCT Filed: Apr. 2, 2018

(86) PCT No.: PCT/JP2018/014154
§ 371 (c)(1),
(2) Date: Aug. 29, 2019

(87) PCT Pub. No.: WO2018/198685
PCT Pub. Date: Nov. 1, 2018

(65) Prior Publication Data
US 2020/0340126 A1    Oct. 29, 2020

(30) Foreign Application Priority Data
Apr. 25, 2017  (JP) .............................. JP2017-086366

(51) Int. Cl.
| | |
|---|---|
| *B21D 39/00* | (2006.01) |
| *C23F 17/00* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/48* | (2006.01) |
| *C22C 38/50* | (2006.01) |
| *C23F 1/28* | (2006.01) |
| *C25F 1/06* | (2006.01) |
| *H01M 8/021* | (2016.01) |
| *H01M 8/0247* | (2016.01) |

(52) U.S. Cl.
CPC ............ *C23F 17/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/48* (2013.01); *C22C 38/50* (2013.01); *C23F 1/28* (2013.01); *C25F 1/06* (2013.01); *H01M 8/021* (2013.01); *H01M 8/0247* (2013.01); *Y10T 428/12389* (2015.01); *Y10T 428/12472* (2015.01)

(58) Field of Classification Search
None
See application file for complete search history.

(56) References Cited

U.S. PATENT DOCUMENTS

| | | | |
|---|---|---|---|
| 8,278,009 B2 | 10/2012 | Ishikawa et al. | |
| 9,531,014 B2 | 12/2016 | Nagoshi et al. | |
| 9,587,297 B2 | 3/2017 | Ishii et al. | |
| 9,653,738 B2 | 5/2017 | Ide et al. | |
| 2009/0226785 A1* | 9/2009 | Kihira ................. | H01M 8/0213 429/508 |
| 2014/0154129 A1 | 6/2014 | Makiishi et al. | |
| 2014/0272668 A1* | 9/2014 | Nagoshi ............... | H01M 8/021 429/509 |

FOREIGN PATENT DOCUMENTS

| | | | | |
|---|---|---|---|---|
| EP | 3470539 A1 | 4/2019 | | |
| EP | 3470540 A1 | 4/2019 | | |
| JP | H08180883 A | 7/1996 | | |
| JP | 2005302713 A | 10/2005 | | |
| JP | 2008091225 A | * | 4/2008 | ............ C23G 1/085 |
| JP | 2008091225 A | 4/2008 | | |
| JP | 2013093299 A | 5/2013 | | |
| JP | 5218612 B2 | 6/2013 | | |
| JP | 5768641 B2 | 8/2015 | | |
| KR | 1020140088886 A | 7/2014 | | |
| KR | 1020160082632 A | 7/2016 | | |
| WO | 2013080533 A1 | 6/2013 | | |
| WO | 2016105070 A1 | 6/2016 | | |

OTHER PUBLICATIONS

Aug. 7, 2020, Communication pursuant to Article 94(3) EPC issued by the European Patent Office in the corresponding European Patent Application No. 18790590.6.
Mar. 11, 2020, the Extended European Search Report issued by the European Patent Office in the corresponding European Patent Application No. 18790590.6.
Jun. 19, 2018, International Search Report issued in the International Patent Application No. PCT/JP2018/014154.
Dec. 2, 2020, Office Action issued by the Korean Intellectual Property Office in the corresponding Korean Patent Application No. 10-2019-7032210 with English language concise statement of relevance.
Jun. 10, 2021, Office Action issued by the Korean Intellectual Property Office in the corresponding Korean Patent Application No. 10-2019-7032210 with English language concise statement of relevance.

\* cited by examiner

*Primary Examiner* — Seth Dumbris
(74) *Attorney, Agent, or Firm* — Kenja IP Law PC

(57) ABSTRACT

A stainless steel sheet for fuel cell separators comprises a predetermined chemical composition, wherein the stainless steel sheet has a textured structure at a surface thereof, an average interval between projected parts of the textured structure being 20 nm or more and 200 nm or less, and a ratio [Cr]/[Fe] of an atomic concentration of Cr existing in chemical form other than metal to an atomic concentration of Fe existing in chemical form other than metal at the surface of the stainless steel sheet is 2.0 or more.

9 Claims, No Drawings

STAINLESS STEEL SHEET FOR FUEL CELL SEPARATORS AND PRODUCTION METHOD THEREFOR

TECHNICAL FIELD

The present disclosure relates to a stainless steel sheet for fuel cell separators and a production method therefor.

BACKGROUND

In recent years, fuel cells that have excellent power generation efficiency and emit no carbon dioxide are being developed for global environment protection. Such a fuel cell generates electricity from hydrogen and oxygen through an electrochemical reaction. The fuel cell has a sandwich-like basic structure, and includes an electrolyte membrane (ion-exchange membrane), two electrodes (fuel electrode and air electrode), gas diffusion layers of $O_2$ (air) and $H_2$, and two separators (bipolar plates).

Fuel cells are classified as phosphoric acid fuel cells, molten carbonate fuel cells, solid oxide fuel cells, alkaline fuel cells, and polymer electrolyte fuel cells (PEFC: proton-exchange membrane fuel cells or polymer electrolyte fuel cells) according to the type of electrolyte membrane used, which are each being developed.

Of these fuel cells, polymer electrolyte fuel cells are particularly expected to be used as power sources in electric vehicles, home or industrial stationary generators, and portable small generators.

A polymer electrolyte fuel cell extracts electricity from hydrogen and oxygen via a polymer membrane. A membrane-electrode joined body is sandwiched between gas diffusion layers (for example, carbon paper) and separators, forming a single component (a single cell). An electromotive force is generated between the separator on the fuel electrode side and the separator on the air electrode side.

The membrane-electrode joined body is called a membrane-electrode assembly (MEA). The membrane-electrode joined body is an assembly of a polymer membrane and an electrode material such as carbon black carrying a platinum catalyst on the front and back surfaces of the membrane, and has a thickness of several 10 μm to several 100 μm. The gas diffusion layers are often integrated with the membrane-electrode joined body.

In the case of actually using polymer electrolyte fuel cells, several tens to hundreds of single cells such as the above are typically connected in series to form a fuel cell stack and put to use.

The separators are required to function not only as
(a) partition walls separating single cells, but also as
(b) conductors carrying generated electrons,
(c) air passages through which oxygen (air) flows and hydrogen passages through which hydrogen flows, and
(d) exhaust passages through which generated water or gas is exhausted (the air passages or the hydrogen passages also serve as the exhaust passages).

The separators therefore need to have excellent durability and electric conductivity.

The durability depends on corrosion resistance. This is because, if metal ions are eluted due to separator corrosion, the proton conductivity of the polymer membrane (electrolyte membrane) decreases and the power generation performance decreases.

Regarding electric conductivity (conductivity), the contact resistance between the separator and the gas diffusion layer is desirably as low as possible, because an increase in the contact resistance between the separator and the gas diffusion layer causes lower power generation efficiency of the polymer electrolyte fuel cell. A lower contact resistance between the separator and the gas diffusion layer contributes to better power generation performance.

Polymer electrolyte fuel cells using graphite as separators have already been in practical use. The separators made of graphite are advantageous in that the contact resistance is relatively low and also corrosion does not occur. The separators made of graphite, however, easily break on impact, and so are disadvantageous in that the size reduction is difficult and the processing cost for forming gas flow passages is high. These drawbacks of the separators made of graphite hinder the widespread use of polymer electrolyte fuel cells.

Attempts have been made to use a metal material as the separator material instead of graphite. In particular, various studies have been conducted to commercialize separators made of stainless steel, titanium, a titanium alloy, or the like for enhanced durability.

For example, JP H8-180883 A (PTL 1) discloses a technique of using, as separators, a metal such as stainless steel or a titanium alloy that easily forms a passive film.

With the technique disclosed in PTL 1, however, the formation of the passive film causes an increase in contact resistance, and leads to lower power generation efficiency. The metal material disclosed in PTL 1 thus has problems such as high contact resistance as compared with the graphite material.

To reduce the contact resistance, for example, JP 5768641 B2 (PTL 2) discloses a "ferritic stainless steel with excellent corrosion resistance and electric conductivity, containing, in mass %, C: 0.001% to 0.05%, Si: 0.001% to 0.5%, Mn: 0.001% to 1.0%, Al: 0.001% to 0.5%, N: 0.001% to 0.05%, Cr: 17% to 23%, and Mo: 0.1% or less with the balance consisting of Fe and inevitable impurities, and having, at a surface thereof, a layer obtained by immersion in an immersion solution that is mainly made of hydrofluoric acid or hydrofluoric nitric acid and satisfies a relationship [HF]≥ [HNO$_3$]. . . [1], where [HF] represents a concentration of hydrofluoric acid and [HNO$_3$] represents a concentration of nitric acid".

JP 2013-93299 A (PTL 3) discloses a "method of producing stainless steel for fuel cell separators, comprising: subjecting stainless steel containing 16 mass % or more Cr to electrolysis; and then immersing the stainless steel in a fluorine-containing solution".

JP 5218612 B2 (PTL 4) discloses a "stainless steel for fuel cell separators, containing, in mass %, C: 0.03% or less, Si: 1.0% or less, Mn: 1.0% or less, S: 0.01% or less, P: 0.05% or less, Al: 0.20% or less, N: 0.03% or less, and Cr: 16% to 40%, and one or more selected from Ni: 20% or less, Cu: 0.6% or less, and Mo: 2.5% or less, with the balance consisting of Fe and inevitable impurities, wherein in the case where a surface of the stainless steel is measured by photoelectron spectroscopy, F is detected, and ((Cr+Fe) in chemical form other than metal)/((Cr+Fe) in metal form) ≥3.0".

WO 2013/080533 A1 (PTL 5) discloses a "stainless steel for fuel cell separators with low surface contact resistance, containing 16 mass % to 40 mass % Cr, and including a region having a fine textured structure at a surface thereof, an area ratio of the region being 50% or more".

JP 2008-91225 A (PTL 6) discloses a "separator for polymer electrolyte fuel cells, comprising a stainless steel sheet containing Cr: 16 mass % to 40 mass % and Mo: 1 mass % to 5 mass % and having micro pits of 0.01 μm to 1

µm in size formed at an entire surface thereof, wherein a passive film in which an atomic number ratio Cr/Fe of Cr and Fe contained as oxide and/or hydroxide is 4 or more is formed at a substrate surface".

CITATION LIST

Patent Literatures

PTL 1: JP H8-180883 A
PTL 2: JP 5768641 B2
PTL 3: JP 2013-93299 A
PTL 4: JP 5218612 B2
PTL 5: WO 2013/080533 A1
PTL 6: JP 2008-91225 A

SUMMARY

Technical Problem

However, when each of the stainless steel sheets disclosed in PTL 2 to PTL 6 is actually used as a fuel cell separator, the contact resistance is not reduced as much as expected at the stage of the material steel sheet, and desired power generation performance may not be achieved.

It could therefore be helpful to provide a stainless steel sheet for fuel cell separators that can achieve low contact resistance in the case of being used as a fuel cell separator.

It could also be helpful to provide a production method for the stainless steel sheet for fuel cell separators.

Solution to Problem

We conducted extensive examination to solve the problems stated above.

First, we examined the reason why, in the case where the stainless steel sheet is actually used as a fuel cell separator, the contact resistance is not reduced as much as expected at the stage of the material steel sheet.

We consequently found out the following: The process of producing a fuel cell stack by connecting several tens to hundreds of single cells in series (hereafter also referred to as "fuel cell stack production process") may involve heat treatment. During this heat treatment, the passive film at the surface of the stainless steel used as the separator grows thick, and, in some cases, grows thick to such an extent that it can be regarded substantially as an oxide layer. Hence, the conductivity of the steel sheet surface decreases from the conductivity at the stage of the material steel sheet, and the contact resistance increases.

We then considered the possibility that, if the growth of the passive film can be suppressed, the increase of the contact resistance can be reduced even when heat treatment and the like are performed in the fuel cell stack production process.

As a result of conducting further examination based on this idea, we discovered that, by forming a predetermined textured structure at the surface of the stainless steel sheet and increasing the ratio of the atomic concentration of Cr existing in chemical form other than metal to the atomic concentration of Fe existing in chemical form other than metal at the surface of the stainless steel sheet, the contact resistance at the stage of the material steel sheet can be reduced and, even when heat treatment and the like are performed in the fuel cell stack production process, low contact resistance can be maintained.

We consider the reason for this to be as follows.

When the predetermined textured structure is formed at the surface of the stainless steel sheet, the area of contact between the stainless steel and the gas diffusion layer increases, and the contact resistance decreases.

If the stainless steel sheet in this state is exposed to a heat treatment environment in the fuel cell stack production process, the passive film formed at the surface of the stainless steel sheet grows thick, and the contact resistance increases.

However, by forming the predetermined textured structure at the surface of the stainless steel sheet and increasing the atomic concentration of Cr existing in chemical form other than metal at the surface of the stainless steel sheet, the Cr concentration in the passive film increases, and the growth of the passive film is suppressed even when the stainless steel sheet is exposed to the heat treatment environment.

Moreover, increasing the atomic concentration of Cr existing in chemical form other than metal at the surface of the stainless steel sheet does not significantly affect the contact resistance of the stainless steel sheet at the material stage.

Thus, the stainless steel sheet according to the present disclosure has reduced contact resistance at the stage of the material steel sheet. In addition, even in the case where the stainless steel sheet is subjected to heat treatment and the like in the fuel cell stack production process and actually used as a fuel cell separator, low contact resistance can be maintained.

As a result of conducting further examination, we discovered that a particularly advantageous way of achieving such a surface state of the stainless steel sheet is to immerse the stainless steel sheet in a solution containing hydrofluoric acid to perform etching treatment and thus form the textured structure at the surface of the stainless steel sheet, and then subject the stainless steel after the etching treatment to immersion in an oxidizing solution or to electrolysis in a potential range in which the stainless steel sheet is passivated. In this way, while maintaining the textured structure at the surface of the stainless steel sheet, the ratio of the atomic concentration of Cr existing in chemical form other than metal to the atomic concentration of Fe existing in chemical form other than metal at the surface of the stainless steel sheet can be increased.

We also discovered that, by performing pretreatment under predetermined conditions before the etching treatment, stable contact resistance reduction effect can be achieved, and stability in the case of mass production in actual machines (hereafter also referred to as "mass production stability") can be improved considerably.

The present disclosure is based on these discoveries and further studies.

We thus provide:

1. A stainless steel sheet for fuel cell separators, wherein the stainless steel sheet has a textured structure at a surface thereof, the textured structure having recessed parts and projected parts, and an average interval between the projected parts being 20 nm or more and 200 nm or less, and a ratio [Cr]/[Fe] of an atomic concentration of Cr existing in chemical form other than metal to an atomic concentration of Fe existing in chemical form other than metal at the surface of the stainless steel sheet is 2.0 or more.

2. A production method for a stainless steel sheet for fuel cell separators, the production method comprising: preparing a stainless steel sheet as a material; subjecting the stainless steel sheet prepared, to etching treatment; and subjecting the stainless steel sheet subjected to the etching treatment, to condensation treatment for Cr existing in chemical form other than metal at a surface of the stainless steel sheet, thereby forming a textured structure having recessed parts and projected parts at the surface of the stainless steel sheet, wherein an average interval between the projected parts is 20 nm or more and 200 nm or less, and a ratio [Cr]/[Fe] of an atomic concentration of Cr existing in chemical form other than metal to an atomic concentration of Fe existing in chemical form other than metal at the surface of the stainless steel sheet is 2.0 or more.

3. The production method for a stainless steel sheet for fuel cell separators according to 2., wherein the etching treatment is immersion in a solution containing hydrofluoric acid.

4. The production method for a stainless steel sheet for fuel cell separators according to 2. or 3., comprising subjecting, before the etching treatment, the stainless steel sheet to electrolysis by anodic electrolysis, cathodic electrolysis, or a combination of anodic electrolysis and cathodic electrolysis.

5. The production method for a stainless steel sheet for fuel cell separators according to any one of 2. to 4., wherein the condensation treatment is immersion in an oxidizing solution or electrolysis in a potential range in which the stainless steel sheet is passivated.

(Advantageous Effect

It is possible to obtain a stainless steel sheet for fuel cell separators having low contact resistance at low cost. The stainless steel sheet for fuel cell separators according to the present disclosure can maintain low contact resistance even in the case of being exposed to a heat treatment environment in a fuel cell stack production process, and therefore is very advantageous in practical use.

The stainless steel sheet for fuel cell separators according to the present disclosure can also be used advantageously in any other cases where it is exposed to an environment in which the growth of the passive film at the steel sheet surface is promoted.

DETAILED DESCRIPTION (1) Stainless Steel Sheet for Fuel Cell Separators

A stainless steel sheet for fuel cell separators according to one of the disclosed embodiments has a predetermined textured structure having recessed parts and projected parts at its surface. The textured structure will be described below.

Average interval between projected parts: 20 nm or more and 200 nm or less

By setting the average interval between the projected parts at the steel sheet surface to 20 nm or more and 200 nm or less, low contact resistance can be obtained.

If the average interval between the projected parts is less than 20 nm, the interval between the recessed parts and the projected parts is excessively narrow. In such a case, sufficient contact between the textured structure and a fuel cell component member such as a gas diffusion layer cannot be achieved, and desired contact resistance cannot be obtained.

If the average interval between the projected parts is more than 200 nm, the recessed parts and the projected parts cannot be finely and densely dispersed at the steel sheet surface. In such a case, sufficient contact area increasing effect cannot be achieved, and desired contact resistance cannot be obtained. Moreover, cracking, rough surface, and the like tend to originate from the recessed parts and the projected parts at the steel sheet surface when working the steel sheet into a separator shape.

Accordingly, the average interval between the projected parts is 20 nm or more and 200 nm or less. The average interval between the projected parts is preferably 30 nm or more, and more preferably 40 nm or more. The average interval between the projected parts is preferably 150 nm or less, and more preferably 100 nm or less.

The average interval between the projected parts is calculated as follows.

The substrate surface of the stainless steel sheet is observed for 10 observation fields with an accelerating voltage of 3 kV and a magnification of 30000 times, using a scanning electron microscope (FE-SEM, produced by Hitachi, Ltd.: S-4100) equipped with a cold cathode field-emission electron gun. On the resultant secondary electron image photographs (SEM photographs), three line segments of 2 μm in length are drawn at an interval of 1 μm in each of the rolling direction and the direction orthogonal to the rolling direction per observation field, and the number of projected parts on each line segment is measured. The length of the line segment is divided by the measured number of projected parts to find the average interval between the projected parts for the line segment, and the obtained values are averaged to find the average interval between the projected parts.

In the secondary electron image photographs (SEM photographs), the recessed parts (parts other than the projected parts) are observed as dark regions and the projected parts are observed as bright regions, and thus they can be distinguished from each other.

It is important to form the above-described textured structure at the surface of the stainless steel sheet for fuel cell separators according to one of the disclosed embodiments and increase the ratio of the atomic concentration of Cr existing in chemical form other than metal to the atomic concentration of Fe existing in chemical form other than metal at the surface of the stainless steel sheet.

Ratio of atomic concentration of Cr existing in chemical form other than metal to atomic concentration of Fe existing in chemical form other than metal at surface of stainless steel sheet: 2.0 or more By setting the ratio (hereafter also referred to as "[Cr]/[Fe]") of the atomic concentration of Cr existing in chemical form other than metal to the atomic concentration of Fe existing in chemical form other than metal at the surface of the stainless steel sheet to 2.0 or more, the growth of the passive film at the steel sheet surface can be suppressed even in the case where the steel sheet is exposed to a heat treatment environment in the fuel cell stack production process. Consequently, low contact resistance can be maintained. [Cr]/[Fe] is preferably 2.5 or more.

Higher [Cr]/[Fe] is more advantageous in terms of suppressing the growth of the passive film at the steel sheet surface. Accordingly, no upper limit is placed on [Cr]/[Fe], although a typical upper limit is about 20.

The "chemical form other than metal" denotes oxide and hydroxide chemical form. In detail, for Cr, examples include $CrO_2$, $Cr_2O_3$, $CrOOH$, $Cr(OH)_3$, and $CrO_3$. For Fe, examples include $FeO$, $Fe_3O_4$, $Fe_2O_3$, and $FeOOH$.

[Cr]/[Fe] can be determined as follows.

The surface of the stainless steel sheet is measured by X-ray photoelectron spectroscopy (hereafter also referred to as "XPS"), and the obtained peaks of Cr and Fe are separated into the peaks of Cr and Fe existing in metal form and the peaks of Cr and Fe existing in chemical form other than metal. Dividing the atomic concentration of Cr existing in chemical form other than metal by the atomic concentration of Fe existing in chemical form other than metal calculated from the separated peaks yields [Cr]/[Fe].

In detail, a sample of 10 mm square is cut out of the steel sheet, and measured by an X-ray photoelectron spectrometer (AXIS-HS produced by Shimadzu/Kratos Co.) with an extraction angle of 45 degrees using a Al-Kα monochromatic X-ray source. The peaks of Cr and Fe are separated into the peaks of Cr and Fe existing in metal form and the peaks of Cr and Fe existing in chemical form other than metal. Dividing the atomic concentration of Cr existing in chemical form other than metal by the atomic concentration of Fe existing in chemical form other than metal calculated from the separated peaks yields [Cr]/[Fe]. Peak separation is performed by removing the background of the spectrum by Shirley method and using a Gauss-Lorentz complex function (proportion of Lorentz function: 30%).

The chemical composition of the stainless steel sheet is not limited, but the stainless steel sheet preferably has a chemical composition containing, in mass %, C: 0.100% or less, Si: 2.00% or less, Mn: 2.00% or less, P: 0.050% or less, S: 0.010% or less, Cr: 11.0% to 40.0%, Al: 0.500% or less, and N: 0.100% or less with the balance consisting of Fe and inevitable impurities.

The reason for this will be explained below. In the following description, "%" regarding components denotes mass % unless otherwise stated.

C: 0.100% or less

C reacts with Cr in the stainless steel and precipitates as Cr carbide in grain boundaries, thus causing a decrease in corrosion resistance. Therefore, less C is desirable in terms of corrosion resistance, and the C content is preferably 0.100% or less. The C content is more preferably 0.030% or less. The C content is further preferably 0.020% or less. No lower limit is placed on the C content, yet the lower limit is preferably about 0.001%.

Si: 2.00% or less

Si is an element effective for deoxidation, and is added at the stage of steelmaking for the stainless steel. To achieve this effect, the Si content is preferably 0.01% or more. Excessively containing Si, however, hardens the stainless steel, as a result of which ductility tends to decrease. Therefore, the Si content is preferably 2.00% or less. The Si content is more preferably 0.60% or less.

Mn: 2.00% or less

Mn is an element effective for deoxidation, and is added at the stage of steelmaking for the stainless steel. To achieve this effect, the Mn content is preferably 0.01% or more. If the Mn content is more than 2.00%, corrosion resistance tends to decrease. Therefore, the Mn content is preferably 2.0% or less. The Mn content is more preferably 1.00% or less.

P: 0.050% or less

P decreases ductility, and thus the P content is desirably low. If the P content is 0.050% or less, ductility does not decrease markedly. Therefore, the P content is preferably 0.050% or less. The P content is more preferably 0.040% or less. No lower limit is placed on the P content, yet the lower limit is preferably about 0.010% because excessive dephosphorization incurs higher cost.

S: 0.010% or less

S is an element that combines with Mn to form MnS and thus decreases corrosion resistance. If the S content is 0.010% or less, corrosion resistance does not decrease markedly. Therefore, the S content is preferably 0.010% or less. No lower limit is placed on the S content, yet the lower limit is preferably about 0.001% because excessive desulfurization incurs higher cost.

Cr: 11.0% to 40.0%

The Cr content is preferably 11.0% or more in order to ensure corrosion resistance. If the Cr content is less than 11.0%, the stainless steel sheet may have difficulty in withstanding long-term use as fuel cell separators in terms of corrosion resistance. The Cr content is preferably 16.0% or more. If the Cr content is more than 40.0%, toughness may decrease due to precipitation of σ phase. Therefore, the Cr content is preferably 40.0% or less. The Cr content is more preferably 32.0% or less.

Al: 0.500% or less

Al is an element used for deoxidation. To achieve this effect, the Al content is preferably 0.001% or more. If the Al content is more than 0.500%, ductility may decrease. Therefore, the Al content is preferably 0.500% or less. The Al content is more preferably 0.150% or less.

N: 0.100% or less

If the N content is more than 0.100%, formability decreases. Therefore, the N content is preferably 0.100% or less. The N content is more preferably 0.030% or less. The N content is further preferably 0.020% or less. No lower limit is placed on the N content, yet the lower limit is preferably about 0.002% because excessive denitriding incurs higher cost.

While the basic components have been described above, the stainless steel sheet for fuel cell separators may further contain the following components in addition to the basic components.

Ni: 30.00% or less

Ni is an element effective for improving the corrosion resistance of the stainless steel. Austenitic stainless steel or ferrite-austenite dual phase stainless steel typically contains a certain amount of Ni. If the Ni content is more than 30.00%, hot workability decreases. Accordingly, in the case of containing Ni, the Ni content is 30.00% or less. The lower limit of the Ni content in austenitic stainless steel or ferrite-austenite dual phase stainless steel is preferably 2.00%.

In the case of containing Ni in ferritic stainless steel, the Ni content is preferably 2.00% or less. The Ni content is more preferably 1.00% or less. The lower limit of the Ni content in ferritic stainless steel is preferably 0.01%.

Cu: 2.50% or less

Cu is an element effective for improving the corrosion resistance of the stainless steel. To achieve this effect, the Cu content is preferably 0.01% or more. If the Cu content is more than 2.50%, hot workability decreases, which leads to a decrease in productivity. Accordingly, in the case of containing Cu, the Cu content is 2.50% or less.

Mo: 4.00% or less

Mo is an element effective for preventing local corrosion such as crevice corrosion of the stainless steel. To achieve this effect, the Mo content is preferably 0.01% or more. If the Mo content is more than 4.00%, the stainless steel embrittles. Accordingly, in case of containing Mo, the Mo content is 4.00% or less.

One or more elements selected from Ti, Nb, and Zr: 1.00% or less in total

Ti, Nb, and Zr contribute to improved intergranular corrosion resistance, and therefore these elements can be contained alone or in combination. To achieve this effect, the content of each element is preferably 0.01% or more. If the total content of these elements is more than 1.00%, however, ductility tends to decrease. Accordingly, in the case of containing any of Ti, Nb, and Zr, the total content of these elements is 1.00% or less. No lower limit is placed on the total content of Ti, Nb, and Zr, yet the lower limit is preferably 0.01%.

The components other than those described above are Fe and inevitable impurities.

In terms of the fuel cell stack installation space and weight, the sheet thickness of the stainless steel sheet is preferably in a range of 0.03 mm to 0.30 mm. If the sheet thickness is less than 0.03 mm, the production efficiency of the metal sheet material decreases. If the sheet thickness is more than 0.30 mm, the stack installation space and weight increase. The sheet thickness is more preferably 0.03 mm or more. The sheet thickness is more preferably 0.10 mm or less.

(3) Production Method

A production method for the stainless steel sheet for fuel cell separators according to one of the disclosed embodiments will be described below.

Preparation

Preparation involves preparing a stainless steel sheet as a material. The stainless steel sheet as a material is not limited as long as it has the above-described chemical composition.

For example, a stainless steel sheet having the above-described chemical composition can be prepared by hot rolling a steel slab having the above-described chemical composition to obtain a hot-rolled sheet, optionally subjecting the hot-rolled sheet to hot-rolled sheet annealing, thereafter cold rolling the hot-rolled sheet to obtain a cold-rolled sheet with a desired sheet thickness, and further optionally subjecting the cold-rolled sheet to cold-rolled sheet annealing.

The conditions of the hot rolling, the cold rolling, the hot-rolled sheet annealing, the cold-rolled sheet annealing, and the like are not limited, and may comply with conventional methods. After the cold-rolled sheet annealing, the stainless steel sheet may be subjected to pickling and skin pass. A stainless steel sheet prepared by bright annealing instead of cold-rolled sheet annealing may also be used.

Pretreatment of Etching Treatment

As pretreatment of the below-described etching treatment (treatment to form the predetermined textured structure at the surface of the steel sheet), the prepared stainless steel sheet may be subjected to electrolysis to remove an oxide layer formed at the surface of the stainless steel sheet. This stabilizes the contact resistance reduction effect of the below-described etching treatment, and considerably improves mass production stability.

The oxide layer formed at the surface of the stainless steel sheet is, for example, a passive film formed in air or a BA layer formed during bright annealing in the production of the stainless steel sheet as a material.

Hence, it is preferable to perform electrolysis as the pretreatment of the etching treatment. The electrolysis may be anodic electrolysis, cathodic electrolysis, or a combination of anodic electrolysis and cathodic electrolysis. In terms of improving mass production stability, cathodic electrolysis is particularly preferable.

By performing any of anodic electrolysis, cathodic electrolysis, and a combination of anodic electrolysis and cathodic electrolysis as the pretreatment of the etching treatment, the oxide layer formed at the surface of the prepared stainless steel sheet is removed, which effectively contributes to stable contact resistance reduction effect of the etching treatment. Particularly in the case where the pretreatment is performed only by cathodic electrolysis, there is little adverse effect of degradation of the etching solution even in mass production, and the oxide layer at the stainless steel surface can be removed more effectively and stably, so that more stable contact resistance reduction effect can be achieved as a result of the etching. Accordingly, the electrolysis performed as the pretreatment of the etching treatment is particularly preferably cathodic electrolysis.

The treatment solution is not limited, but is preferably a sulfuric acid aqueous solution, for example.

The concentration of the treatment solution is adjusted so that the treatment solution has sufficiently high conductivity. For example, in the case of a sulfuric acid aqueous solution, the concentration is preferably about 10 g/L to 100 g/L.

The treatment temperature is not limited, but is preferably 30° C. to 85° C.

As a result of performing the pretreatment before the etching treatment in this way, contact resistance reduction effect can be achieved stably, and mass production stability can be improved considerably.

As electrolysis conditions, it is preferable to adjust the total electric charge applied in a range of +0.1 $C/dm^2$ to +6000 $C/dm^2$ (current density: +0.1 $A/dm^2$ to +10 $A/dm_2$, electrolysis time: 1 sec to 600 sec) in the case of anodic electrolysis, and in a range of −0.1 $C/dm^2$ to −6000 $C/dm^2$ (current density: −0.1 $A/dm^2$ to −10 $A/dm^2$, electrolysis time: 1 sec to 600 sec) in the case of cathodic electrolysis.

As electrolysis conditions in the case of combining anodic electrolysis and cathodic electrolysis, it is preferable to combine anodic electrolysis with the total electric charge applied being adjusted in a range of +0.1 $C/dm^2$ to +6000 $C/dm^2$ (current density: +0.1 $A/dm^2$ to +10 $A/dm$', electrolysis time: 1 sec to 600 sec) and cathodic electrolysis with the total electric charge applied being adjusted in a range of −0.1 $C/dm^2$ to −6000 $C/dm^2$ (current density: −0.1 $A/dm$' to −10 $A/dm^2$, electrolysis time: 1 sec to 600 sec).

The treatment temperature is not limited, but is preferably 30° C. to 85° C.

Etching Treatment

The prepared stainless steel sheet or the stainless steel sheet obtained as a result of the pretreatment is subjected to etching treatment to form the predetermined textured structure at the surface of the stainless steel sheet.

The etching treatment is not limited. To obtain the textured structure described above, the stainless steel sheet is preferably immersed in a solution containing hydrofluoric acid, such as a hydrofluoric acid aqueous solution or a nitric hydrofluoric acid aqueous solution (a mixed acid aqueous solution of hydrofluoric acid and nitric acid).

The concentration of hydrofluoric acid is preferably in a range of 1 g/L to 200 g/L. If the concentration of hydrofluoric acid is less than 1 g/L, etching is insufficient, and the desired textured structure is hard to be obtained. If the concentration of hydrofluoric acid is more than 200 g/L, the etching effect is saturated. In addition, the waste liquid treatment cost increases, and safety is undermined. The concentration of hydrofluoric acid is preferably 10 g/L or more. The concentration of hydrofluoric acid is preferably 150 g/L or less.

Nitric acid may be contained in addition to hydrofluoric acid. The inclusion of nitric acid promotes passivation, in addition to forming the textured structure. This can shorten the treatment time in the below-described condensation treatment for Cr existing in chemical form other than metal at the surface of the stainless steel sheet. The concentration of nitric acid is preferably in a range of 1 g/L to 100 g/L.

If the concentration of nitric acid is excessively high, passivation progresses excessively, and the desired textured structure is hard to be obtained. Hence, the concentration of hydrofluoric acid is preferably higher than the concentration of nitric acid.

The solution containing hydrofluoric acid may contain inorganic acids other than hydrofluoric acid and nitric acid (hereafter also referred to as "other inorganic acids"), such as sulfuric acid and hydrochloric acid, in a range of 10 g/L or less in total. Here, the concentration of hydrofluoric acid is preferably higher than the (total) concentration of the other inorganic acids.

The treatment temperature and the treatment time in the etching treatment are not limited, but are preferably 30° C. to 60° C. and 1 sec to 600 sec. The treatment time is more preferably 30 sec or more. The treatment time is more preferably 300 sec or less.

Condensation Treatment for Cr Existing in Chemical Form Other than Metal at Surface of Stainless Steel Sheet The stainless steel sheet subjected to the etching treatment as described above is then subjected to treatment (hereafter also referred to as "Cr condensation treatment") of condensing Cr existing in chemical form other than metal at the surface of the stainless steel sheet. Thus, the ratio ([Cr]/[Fe]) of the atomic concentration of Cr existing in chemical form other than metal to the atomic concentration of Fe existing in chemical form other than metal at the surface of the stainless steel sheet can be increased.

Examples of the Cr condensation treatment include immersion in an oxidizing solution and electrolysis in a potential range in which the stainless steel sheet is passivated.

Examples of the oxidizing solution include a nitric acid aqueous solution and a hydrogen peroxide aqueous solution. A longer immersion time facilitates the condensation of Cr in the passive film. However, if the immersion time is excessively long, the effect is saturated and productivity decreases. Accordingly, the immersion time is preferably 2 hr (120 min) or less. No lower limit is placed on the immersion time, yet the immersion time is preferably 1 min or more. The immersion time is more preferably 5 min or more.

In the case of using a nitric acid aqueous solution, the concentration of nitric acid is preferably 10 g/L to 400 g/L. The treatment temperature is not limited, but is preferably 30° C. to 60° C.

In the electrolysis, the potential is adjusted to such a potential range in which the stainless steel sheet is passivated. In particular, it is preferable to adjust the potential to such a potential range in which components such as Fe and Ni other than Cr in the steel are dissolved and Cr is not dissolved.

The potential range (passivation area) in which the stainless steel sheet is passivated varies depending on the electrolytic solution used and the chemical composition of the stainless steel sheet. It is therefore preferable to adjust the potential in each case. For example, in the case of using a 50 g/L nitric acid aqueous solution, electrolysis is preferably performed in a potential range of 0.4 V to 0.8 V (vs. Ag/AgCl). A longer electrolysis time facilitates the condensation of Cr existing in chemical form other than metal at the steel sheet surface. However, if the electrolysis time is excessively long, the effect is saturated and productivity decreases. Accordingly, the electrolysis time is preferably 1 min or more and 2 hr (120 min) or less. The electrolysis time is more preferably 5 min or more.

EXAMPLES

Example 1

Stainless steel sheets (bright annealed sheets) of 0.1 mm in sheet thickness having the chemical compositions listed in Table 1 (the balance consisting of Fe and inevitable impurities) were prepared, and subjected to electrolysis as pretreatment of etching treatment in the following electrolysis patterns of aca, c, and a in a 30 g/L sulfuric acid aqueous solution at a treatment temperature of 40° C. Samples No. 1 to 3, 12, 17, 18, 21, 24, and 28 were not subjected to electrolysis as pretreatment of etching treatment.

Electrolysis Patterns of Electrolysis as Pretreatment of Etching Treatment aca (combination of anodic electrolysis followed by cathodic electrolysis and further followed by anodic electrolysis): total electric charge applied: +2 C/dm$^2$ (current density: +2 A/dm$^2$, treatment time: 1 sec) →total electric charge applied: −2 C/dm$^2$ (current density: −2 A/dm$^2$, treatment time: 1 sec) →total electric charge applied: +2 C/dm$^2$ (current density: +2 A/dm$^2$, treatment time: 1 sec).

c (only cathodic electrolysis): total electric charge applied: −6 C/dm$^2$ (current density: −2 A/dm$^2$, treatment time: 3 sec).

a (only anodic electrolysis): total electric charge applied: +20 C/dm$^2$ (current density: +0.5 A/dm$^2$, treatment time: 40 sec).

After this, etching treatment and then Cr condensation treatment were performed under the conditions listed in Table 2, to obtain stainless steel sheets for separators.

For samples No. 2, 3, 5 to 7, and 10 to 31, Cr condensation treatment was performed by immersion in a 300 g/L nitric acid aqueous solution at a temperature of 60° C. for 1 min, 5 min, 10 min, 15 min, or 90 min.

For sample No. 8, Cr condensation treatment was performed by electrolysis under the conditions of temperature: 40° C., potential: 0.5 V (vs. Ag/AgCl), and electrolysis time: 5 min using a 50 g/L nitric acid aqueous solution. Here, an anode polarization curve in the electrolytic solution was measured, and the potential range in which the current density was 10 μA/cm$^2$ or less was taken to be a potential range (passivation area) in which the stainless steel sheet was passivated. For each stainless steel sheet having the chemical composition of steel sample ID A (sample No. 8), a potential of 0.5 V (vs. Ag/AgCl) was in a passivation area.

Sample No. 12 was not subjected to etching treatment. Samples No. 1, 4, and 9 were not subjected to Cr condensation treatment.

Sample No. 17 was subjected to etching treatment by immersion in a 300 g/L sulfuric acid aqueous solution.

The contact resistance of each resultant stainless steel sheet for separators was evaluated as follows.

A sample was sandwiched between sheets of carbon paper (TGP-H-120 produced by Toray Industries, Inc.), and further contacted from both sides by Au plated Cu electrodes. A pressure of 0.98 MPa (=10 kg/cm$^2$) per unit area was applied to cause current to flow, and the voltage difference between the electrodes was measured to calculate the electric resistance. The value obtained by multiplying the measured electric resistance by the area of the contact surface was taken to be the contact resistance value, and the contact resistance was evaluated based on the following criteria. The evaluation results are listed in Table 2.

Moreover, each stainless steel sheet for separators was subjected to heat treatment of holding in an air atmosphere at 200° C. for 2 hr, assuming heat treatment in a fuel cell stack production process. The contact resistance of the stainless steel sheet after heat treatment was evaluated in the same way as above. The evaluation results are listed in Table 2.

The evaluation criteria of the contact resistance before heat treatment and the contact resistance after heat treatment are as follows.

Before Heat Treatment
  Pass: 20 mΩ·cm² or less
  Fail: more than 20 mΩ·cm²
After Heat Treatment
  Pass: 30 mΩ·cm² or less
  Fail: more than 30 mΩ·cm²

In addition, the steel sheet surface was observed and the average interval between the projected parts of the textured structure was measured by the foregoing method. Further, the ratio [Cr]/[Fe] of the atomic concentration of Cr existing in chemical form other than metal to the atomic concentration of Fe existing in chemical form other than metal at the steel sheet surface was measured by the foregoing method. The measurement results are listed in Table 2. In the samples other than sample No. 12, a textured structure was formed at the steel sheet surface. The contact resistance after heat treatment of sample No. 12 was too high and was unmeasurable (range over).

TABLE 1

| Steel sample ID | Chemical composition (mass %) | | | | | | | | | | | |
|---|---|---|---|---|---|---|---|---|---|---|---|---|
| | C | Si | Mn | P | S | Cr | Al | N | Ni | Cu | Mo | Others |
| A | 0.009 | 0.14 | 0.18 | 0.027 | 0.002 | 20.8 | 0.033 | 0.009 | 0.21 | 0.43 | 0.06 | Ti: 0.29 |
| B | 0.005 | 0.18 | 0.16 | 0.026 | 0.007 | 30.3 | 0.079 | 0.012 | 0.22 | — | 1.80 | Nb: 0.14 |
| C | 0.018 | 0.68 | 1.01 | 0.040 | 0.004 | 17.8 | 0.002 | 0.027 | 12.04 | 0.44 | 2.05 | — |
| D | 0.005 | 0.39 | 0.21 | 0.031 | 0.006 | 18.8 | 0.003 | 0.008 | 0.31 | — | 1.88 | Nb: 0.35, Zr: 0.03 |
| E | 0.057 | 0.41 | 1.10 | 0.029 | 0.002 | 18.1 | 0.001 | 0.037 | 8.02 | 0.24 | 0.15 | — |

TABLE 2

| Sample No. | Steel sample ID | Sample production conditions | | | | | | Average interval between projected parts (nm) |
|---|---|---|---|---|---|---|---|---|
| | | Etching treatment | | | | Cr condensation treatment | | |
| | | Pretreatment Electrolysis pattern | Treatment solution | Treatment temperature (° C.) | Treatment time (sec) | Treatment method | Immersion time or electrolysis time (min) | |
| 1 | A | — | 50 g/L hydrofluoric acid aqueous solution | 55 | 120 | — | — | 80 |
| 2 | | — | 50 g/L hydrofluoric acid aqueous solution | 55 | 120 | Immersion | 10 | 84 |
| 3 | | — | 50 g/L hydrofluoric acid aqueous solution | 55 | 120 | Immersion | 90 | 85 |
| 4 | | aca | 50 g/L hydrofluoric acid aqueous solution | 55 | 90 | — | — | 76 |
| 5 | | aca | 50 g/L hydrofluoric acid aqueous solution | 55 | 90 | Immersion | 15 | 81 |
| 6 | | aca | 50 g/L hydrofluoric acid aqueous solution | 55 | 240 | Immersion | 10 | 124 |
| 7 | | c | 50 g/L hydrofluoric acid aqueous solution | 55 | 120 | Immersion | 15 | 73 |
| 8 | | c | 50 g/L hydrofluoric acid aqueous solution | 55 | 30 | Electrolysis | 5 | 28 |
| 9 | | c | 50 g/L hydrofluoric acid aqueous solution | 55 | 60 | — | — | 65 |
| 10 | | c | 50 g/L hydrofluoric acid aqueous solution | 55 | 60 | Immersion | 15 | 67 |
| 15 | | c | 50 g/L hydrofluoric acid aqueous solution | 55 | 60 | Immersion | 1 | 70 |
| 11 | | aca | 50 g/L, hydrofluoric acid + 20 g/L nitric acid aqueous solution | 55 | 120 | Immersion | 5 | 93 |
| 12 | | — | — | — | — | Immersion | 15 | — |
| 16 | | a | 50 g/L hydrofluoric acid aqueous solution | 55 | 120 | Immersion | 15 | 75 |
| 17 | | — | 300 g/L sulfuric acid aqueous solution | 80 | 90 | Immersion | 1 | 489 |
| 18 | B | — | 50 g/L hydrofluoric acid + 20 g/L nitric acid aqueous solution | 55 | 120 | Immersion | 15 | 57 |
| 19 | | aca | 50 g/L hydrofluoric acid + 20 g/L nitric acid aqueous solution | 55 | 120 | Immersion | 15 | 63 |
| 20 | | c | 50 g/L hydrofluoric acid + 20 g/L nitric acid aqueous solution | 55 | 120 | Immersion | 15 | 59 |

TABLE 2-continued

| | | | | | | | |
|---|---|---|---|---|---|---|---|
| 13 | | a | 50 g/L hydrofluoric acid + 20 g/L nitric acid aqueous solution | 55 | 120 | Immersion | 15 | 54 |
| 21 | C | — | 50 g/L hydrofluoric acid aqueous solution | 55 | 60 | Immersion | 15 | 91 |
| 22 | | aca | 50 g/L hydrofluoric acid aqueous solution | 55 | 60 | Immersion | 15 | 100 |
| 14 | | c | 50 g/L hydrofluoric acid aqueous solution | 55 | 60 | Immersion | 15 | 95 |
| 23 | | a | 50 g/L hydrofluoric acid aqueous solution | 55 | 60 | Immersion | 15 | 87 |
| 24 | E | — | 50 g/L hydrofluoric acid aqueous solution | 55 | 120 | Immersion | 15 | 95 |
| 25 | | aca | 50 g/L hydrofluoric acid aqueous solution | 55 | 120 | Immersion | 15 | 94 |
| 26 | | c | 50 g/L hydrofluoric acid aqueous solution | 55 | 120 | Immersion | 15 | 91 |
| 27 | | a | 50 g/L hydrofluoric acid aqueous solution | 55 | 120 | Immersion | 15 | 105 |
| 28 | D | — | 50 g/L hydrofluoric acid aqueous solution | 55 | 120 | Immersion | 15 | 80 |
| 29 | | aca | 50 g/L hydrofluoric acid aqueous solution | 55 | 120 | Immersion | 15 | 71 |
| 30 | | c | 50 g/L hydrofluoric acid aqueous solution | 55 | 120 | Immersion | 15 | 74 |
| 31 | | a | 50 g/L hydrofluoric acid aqueous solution | 55 | 120 | Immersion | 15 | 77 |

| | | | Evaluation result | | | | |
|---|---|---|---|---|---|---|---|
| | | [Cr] in chemical | Before heat treatment | | After heat treatment | | |
| Sample No. | Steel sample ID | form other than metal/ [Fe] in chemical form other than metal | Contact resistance value (mΩ·cm$^2$) | Determination | Contact resistance value (mΩ·cm$^2$) | Determination | Remarks |
| 1 | A | 0.9 | 12.6 | Pass | 40.9 | Fail | Comp. Ex. |
| 2 | | 3.0 | 11.3 | Pass | 14.9 | Pass | Ex. |
| 3 | | 4.4 | 11.7 | Pass | 14.5 | Pass | Ex. |
| 4 | | 1.1 | 12.4 | Pass | 31.8 | Fail | Comp. Ex. |
| 5 | | 4.1 | 11.2 | Pass | 15.7 | Pass | Ex. |
| 6 | | 3.1 | 11.5 | Pass | 15.8 | Pass | Ex. |
| 7 | | 4.6 | 11.0 | Pass | 15.1 | Pass | Ex. |
| 8 | | 2.3 | 12.5 | Pass | 17.6 | Pass | Ex. |
| 9 | | 1.1 | 12.0 | Pass | 31.4 | Fail | Comp. Ex. |
| 10 | | 3.7 | 10.8 | Pass | 15.2 | Pass | Ex. |
| 15 | | 3.1 | 11.3 | Pass | 17.1 | Pass | Ex. |
| 11 | | 3.0 | 11.5 | Pass | 15.3 | Pass | Ex. |
| 12 | | 3.5 | 512.6 | Fail | unmeasurable | — | Comp. Ex. |
| 16 | | 4.2 | 10.9 | Pass | 15.8 | Pass | Ex. |
| 17 | | 3.0 | 25.6 | Fail | 42.4 | Fail | Comp. Ex. |
| 18 | B | 4.9 | 19.4 | Pass | 29.2 | Pass | Ex. |
| 19 | | 4.8 | 18.2 | Pass | 28.4 | Pass | Ex. |
| 20 | | 5.0 | 17.6 | Pass | 27.2 | Pass | Ex. |
| 13 | | 4.8 | 17.4 | Pass | 27.1 | Pass | Ex. |
| 21 | C | 3.2 | 12.0 | Pass | 28.6 | Pass | Ex. |
| 22 | | 3.1 | 12.2 | Pass | 28.8 | Pass | Ex. |
| 14 | | 3.0 | 12.7 | Pass | 29.5 | Pass | Ex. |
| 23 | | 3.2 | 12.5 | Pass | 29.1 | Pass | Ex. |
| 24 | E | 3.0 | 13.1 | Pass | 29.7 | Pass | Ex. |
| 25 | | 3.3 | 12.8 | Pass | 29.4 | Pass | Ex. |
| 26 | | 3.1 | 12.5 | Pass | 29.2 | Pass | Ex. |
| 27 | | 3.0 | 12.6 | Pass | 29.2 | Pass | Ex. |
| 28 | D | 3.5 | 11.5 | Pass | 15.9 | Pass | Ex. |
| 29 | | 3.4 | 11.2 | Pass | 15.3 | Pass | Ex. |
| 30 | | 3.6 | 11.6 | Pass | 15.5 | Pass | Ex. |
| 31 | | 3.4 | 11.5 | Pass | 15.8 | Pass | Ex. |

The results in Table 2 reveal the following points.

(a) All Examples (Ex.) had desired contact resistance both before and after heat treatment.

(b) Regarding Comparative Examples (Comp. Ex.), samples No. 1, 4, and 9 were not subjected to Cr condensation treatment, so that the ratio [Cr]/[Fe] of the atomic concentration of Cr existing in chemical form other than metal to the atomic concentration of Fe existing in chemical form other than metal was less than 2.0. Thus, desired contact resistance was not obtained after heat treatment.

Sample No. 12 was not subjected to etching treatment, so that the predetermined textured structure was not formed at the surface of the stainless steel sheet. Thus, desired contact resistance was not obtained before and after heat treatment.

Sample No. 17 was subjected to etching treatment by immersion in a sulfuric acid aqueous solution, so that sufficient etching effect was not achieved, and the predetermined textured structure was not formed at the surface of the stainless steel sheet. Thus, desired contact resistance was not obtained before and after heat treatment.

Example 2

To evaluate mass production stability, 100 stainless steel sheets were continuously treated under the same treatment conditions as each of samples No. 2, 3, 5, 10, 13, 14, 16, and 18 to 31 in Example 1, thus obtaining 100 samples (stainless steel sheets for separators). These samples are hereafter referred to as samples No. 2-100, No. 3-100, . . . .

Assuming degradation of the treatment solutions in the case of mass production in actual machines, the treatment solution in the pretreatment, the treatment solution in the etching treatment, and the treatment solution in the Cr condensation treatment were unchanged, i.e. the same treatment solutions were continuously used, during the continuous treatment of 100 stainless steel sheets. The treatment area per stainless steel sheet was 40 mm×40 mm (double-side treatment), and the amount of the treatment solution was 500 cc.

The contact resistance of each resultant sample was evaluated in the same way as Example 1. Each sample whose contact resistance value before heat treatment was 20 mΩ·cm$^2$ or less and whose contact resistance value after heat treatment was 30 mΩ·cm$^2$ or less was evaluated as "pass".

The pass ratio was then calculated for each treatment condition (sample No.) according to the following formula, and the mass production stability was evaluated based on the following criteria:

[pass ratio (%)]=[the number of "pass" samples]/[the total number of samples]×100.

Pass (excellent): pass ratio of 100%
Pass (good): pass ratio of 90% or more and less than 100%
Pass: pass ratio of 70% or more and less than 90%
Fail: pass ratio of less than 70%

TABLE 3

| | | Sample production conditions | | | | | Mass production stability evaluation result | | |
| | | | Etching treatment | | | Cr condensation treatment | | | |
| Sample No. | Steel sample ID | Pretreatment Electrolysis pattern | Treatment solution | Treatment temperature (° C.) | Treatment time (sec) | Treatment method | Immersion time or electrolysis time (min) | Pass ratio (%) | Evaluation | Remarks |
|---|---|---|---|---|---|---|---|---|---|---|
| 2-100 | A | — | 50 g/L hydrofluoric acid aqueous solution | 55 | 120 | Immersion | 10 | 72 | Pass | Ex. |
| 3-100 | | — | 50 g/L hydrofluoric acid aqueous solution | 55 | 120 | Immersion | 90 | 75 | Pass | Ex. |
| 5-100 | | aca | 50 g/L hydrofluoric acid aqueous solution | 55 | 90 | Immersion | 15 | 96 | Pass (good) | Ex. |
| 10-100 | | c | 50 g/L hydrofluoric acid aqueous solution | 55 | 60 | Immersion | 15 | 100 | Pass (excellent) | Ex. |
| 16-100 | | a | 50 g/L hydrofluoric acid aqueous solution | 55 | 120 | Immersion | 15 | 94 | Pass (good) | Ex. |
| 18-100 | B | — | 50 g/L hydrofluoric acid + 20 g/L nitric acid aqueous solution | 55 | 120 | Immersion | 15 | 73 | Pass | Ex. |
| 19-100 | | aca | 50 g/L hydrofluoric acid + 20 g/L nitric acid aqueous solution | 55 | 120 | Immersion | 15 | 91 | Pass (good) | Ex. |
| 20-100 | | c | 50 g/L hydrofluoric acid + 20 g/L nitric acid aqueous solution | 55 | 120 | Immersion | 15 | 100 | Pass (excellent) | Ex. |
| 13-100 | | a | 50 g/L hydrofluoric acid + 20 g/L nitric acid aqueous solution | 55 | 120 | Immersion | 15 | 92 | Pass (good) | Ex |
| 21-100 | C | — | 50 g/L hydrofluoric acid aqueous solution | 55 | 60 | Immersion | 15 | 72 | Pass | Ex. |
| 22-100 | | aca | 50 g/L hydrofluoric acid aqueous solution | 55 | 60 | Immersion | 15 | 97 | Pass (good) | Ex. |
| 14-100 | | c | 50 g/L hydrofluoric acid aqueous solution | 55 | 60 | Immersion | 15 | 100 | Pass (excellent) | Ex. |
| 23-100 | | a | 50 g/L hydrofluoric acid aqueous solution | 55 | 60 | Immersion | 15 | 94 | Pass (good) | Ex. |
| 24-100 | D | — | 50 g/L hydrofluoric acid aqueous solution | 55 | 120 | Immersion | 15 | 70 | Pass | Ex. |
| 25-100 | | aca | 50 g/L hydrofluoric acid aqueous solution | 55 | 120 | Immersion | 15 | 95 | Pass (good) | Ex. |
| 26-100 | | c | 50 g/L hydrofluoric acid aqueous solution | 55 | 120 | Immersion | 15 | 100 | Pass (excellent) | Ex. |
| 27-100 | | a | 50 g/L hydrofluoric acid aqueous solution | 55 | 120 | Immersion | 15 | 92 | Pass (good) | Ex. |
| 28-100 | E | — | 50 g/L hydrofluoric acid aqueous solution | 55 | 120 | Immersion | 15 | 81 | Pass | Ex. |
| 29-100 | | aca | 50 g/L hydrofluoric acid aqueous solution | 55 | 120 | Immersion | 15 | 95 | Pass (good) | Ex. |
| 30-100 | | c | 50 g/L hydrofluoric acid aqueous solution | 55 | 120 | Immersion | 15 | 100 | Pass (excellent) | Ex. |

TABLE 3-continued

| | | Sample production conditions | | | | | | Mass production stability evaluation result | | |
|---|---|---|---|---|---|---|---|---|---|---|
| | | | Etching treatment | | | | Cr condensation treatment | | | |
| Sample No. | Steel sample ID | Pretreatment Electrolysis pattern | Treatment solution | Treatment temperature (°C.) | Treatment time (sec) | Treatment method | Immersion time or electrolysis time (min) | Pass ratio (%) | Evaluation | Remarks |
| 31-100 | | a | 50 g/L hydrofluoric acid aqueous solution | 55 | 120 | Immersion | 15 | 93 | Pass (good) | Ex. |

As can be understood from Table 3, in the case where pretreatment was performed under predetermined conditions before etching treatment, superior mass production stability was achieved. Particularly in samples No. 10-100, No. 20-100, No. 14-100, No. 26-100, and No. 30-100 subjected to pretreatment by cathodic electrolysis, there was little adverse effect of degradation of the etching solution, and the oxide layer at the stainless steel surface was effectively and stably removed through to the end of the continuous treatment of 100 stainless steel sheets. Hence, in samples No. 10-100, No. 20-100, No. 14-100, No. 26-100, and No. 30-100, very high mass production stability was achieved.

The invention claimed is:

1. A stainless steel sheet for fuel cell separators,
wherein the stainless steel sheet has a textured structure at a surface thereof, the textured structure having recessed parts and projected parts, and an average interval between the projected parts being 20 nm or more and 200 nm or less, and
a ratio [Cr]/[Fe] of an atomic concentration of Cr existing in chemical form other than metal to an atomic concentration of Fe existing in chemical form other than metal at the surface of the stainless steel sheet is 2.0 or more and 3.7 or less.

2. A production method for a stainless steel sheet for fuel cell separators, the production method comprising:
preparing a stainless steel sheet as a material;
subjecting the stainless steel sheet prepared, to etching treatment; and
subjecting the stainless steel sheet subjected to the etching treatment, to condensation treatment for Cr existing in chemical form other than metal at a surface of the stainless steel sheet,
thereby forming a textured structure having recessed parts and projected parts at the surface of the stainless steel sheet, wherein an average interval between the projected parts is 20 nm or more and 200 nm or less, and a ratio [Cr]/[Fe] of an atomic concentration of Cr existing in chemical form other than metal to an atomic concentration of Fe existing in chemical form other than metal at the surface of the stainless steel sheet is 2.0 or more and 3.7 or less.

3. The production method for a stainless steel sheet for fuel cell separators according to claim 2, wherein the etching treatment is immersion in a solution containing hydrofluoric acid.

4. The production method for a stainless steel sheet for fuel cell separators according to claim 2, comprising
subjecting, before the etching treatment, the stainless steel sheet to electrolysis by anodic electrolysis, cathodic electrolysis, or a combination of anodic electrolysis and cathodic electrolysis.

5. The production method for a stainless steel sheet for fuel cell separators according to claim 2, wherein the condensation treatment is immersion in an oxidizing solution or electrolysis in a potential range in which the stainless steel sheet is passivated.

6. The production method for a stainless steel sheet for fuel cell separators according to claim 3, comprising
subjecting, before the etching treatment, the stainless steel sheet to electrolysis by anodic electrolysis, cathodic electrolysis, or a combination of anodic electrolysis and cathodic electrolysis.

7. The production method for a stainless steel sheet for fuel cell separators according to claim 3, wherein the condensation treatment is immersion in an oxidizing solution or electrolysis in a potential range in which the stainless steel sheet is passivated.

8. The production method for a stainless steel sheet for fuel cell separators according to claim 4, wherein the condensation treatment is immersion in an oxidizing solution or electrolysis in a potential range in which the stainless steel sheet is passivated.

9. The production method for a stainless steel sheet for fuel cell separators according to claim 6, wherein the condensation treatment is immersion in an oxidizing solution or electrolysis in a potential range in which the stainless steel sheet is passivated.

* * * * *